United States Patent [19]

Frappé

[11] 3,752,590
[45] Aug. 14, 1973

[54] AUTOMATIC RECOGNITION OF COLORS
[75] Inventor: Pierre Frappé, Lyon, France
[73] Assignee: Verdal S.A., Lyon, France
[22] Filed: Nov. 9, 1971
[21] Appl. No.: 196,889

[30] Foreign Application Priority Data
Nov. 30, 1970 France .............................. 7043976

[52] U.S. Cl. ........................ 356/176, 8/25, 250/226
[51] Int. Cl. ............................. G01j 3/46, G01j 3/42
[58] Field of Search ...................... 356/173 T; 8/25; 250/226

[56] References Cited
OTHER PUBLICATIONS
Seaton, Int'l Dyer & Textile Printer July 5, 1968, pp. 20–22.

Primary Examiner—Ronald L. Wibert
Assistant Examiner—R. J. Webster
Attorney—Arthur E. Dowell, Jr. et al.

[57] ABSTRACT

The invention refers to a method for the automatic recognition of coloring dyes, for instance in a drawing, by illuminating the sample by a beam of light of known characteristics and by analyzing the light reflected in a number of primary colors or wave lengths, recognition of the dye from which the light is reflected being based on the position of the point which represents the responses of the photo-sensitive analyzing means corresponding to each primary color in a system of coordinates having a number of axes equal to the number of said primary colors. According to the invention the real locus (surface or volume) of all possible representative points is determined for each dye, lines or surfaces are drawn to pass between these loci, these lines or surfaces are each represented analogically by electronic circuits receiving as inlet signals the responses of the photo-sensitive means to emit a zero outlet signal for a point which would be situated on this line or surface and the position of the representative point of an unknown dye is deduced from the signs of the outlet of these circuits.

Alternatively the dyes are considered by pairs in a number of two-dimensional coordinate systems.

8 Claims, 13 Drawing Figures

AUTOMATIC RECOGNITION OF COLORS

The present invention relates to the automatic recognition of colors, as for instance by means of photo-electrical devices.

The problem of the automatic recognition of colors, or more exactly of coloring dyes, arises in many practical cases, as for instance in the reading-in of the designs used in the preparation of perforated cards or bands for loom Jacquards. In such designs the various weaves are indicated by different colors each resulting from the use of a particular dye. A skilled reader distinguishes readily the various colors of the drawing and he actuates in accordance the perforating machine. But experience has demonstrated that automatic reading devices are quite defective in this respect and generate erroneous responses as soon as the number of different colors or dyes used in the drawing increases.

It has already been proposed to avoid these inconveniences by considering the spectral components of each dye in a system of primary colors or wave lenghts (generally three, such as blue, green and red, but sometimes only two such as blue and red). The drawing or other sample is then illuminated by a beam of light of predetermined characteristics and the intensity of the light which it reflects is measured by photo-electric means in the primary colors or wave lengths selected. The intensities or responses thus obtained theoritically individualize the dye. In other words, taking for instance the quite simple two-color system, the responses of the photo-electric measuring devices may be plotted as abscissae and ordinates and for each dye there would thus be found a single representative point. But in actual practice the responses of the photo-electric devices vary in accordance with the density of the dye on the paper. Moreover commercial dyes are not quite uniform in their characteristics. It results therefrom that the response for each primary color may vary between certain limits. Taking these limits into consideration, in a two-coordinate system the representation of each dye in the successive samples is no more a point, but a rectangle (in a three-coordinate system it would be a parallelipiped). As long as these rectangles (or parallelipipeds) do not intersect each other, the automatic recognition of the dyes remains possible, but as soon as the number of dyes used in the drawing is somewhat high, as for instance exceeds four or five, such is no more the case and it will be readily understood that when the point corresponding to the responses of the photo-electric devices is situated in the zone common to two rectangles (or parallelipipeds), any automatic recognition between the corresponding dyes becomes quite impossible.

The present invention has for its object to greatly improve the possibilities of recognition of the various dyes or colors of a design or other object.

In accordance with the present invention in a method for the recognition of the various dyes used in a sample such as a drawing, of the kind wherein the sample is illuminated by a beam of light of predetermined characteristics, the intensity of the light reflected by the sample being measured in a number of primary colors and the corresponding representative point being situated in a system of coordinates corresponding to the values measured in each primary color, the surface or volume which forms the locus of the possible representative points of each dye taking into account the unavoidable variations of its density and of its characteristics, is determined in the said coordinate system, lines or surfaces passing between the said loci are also drawn in the said system, and these lines or surfaces are analogically represented by electronic circuits in order that the position of the representative point of the dye with respect to the said lines or surfaces may be automatically detected for any sample being analyzed.

When only two primary colors are used the coordinate system is of the two-dimensional type and the loci corresponding to the various dyes are surfaces which may be separated by straight lines or by successions of segments of straight lines. Such lines or segments may be easily represented electronically. With three primary colors the coordinate system becomes three-dimensional, the loci are volumes which must be separated by planes or by successions of portions of such planes, and the electronic representation is more difficult. In the case of more than three primary colors it is still possible to imagine systems comprising more than three coordinates, but this still more complicates the electronic circuits. In accordance with the present invention these difficulties are avoided by considering the primary colors by successive pairs, as for instance blue-green, green-red and red-blue in the case of three colors. Each pair thus corresponds to a quite simple two-dimensional system which only requires simple and inexpensive electronic circuits.

Figure 3:
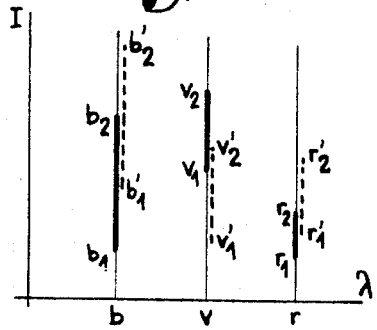

FIG. 3 demonstrates that such a differentiation is impossible when there is an overlapping in the three primary colors.

Figure 4:
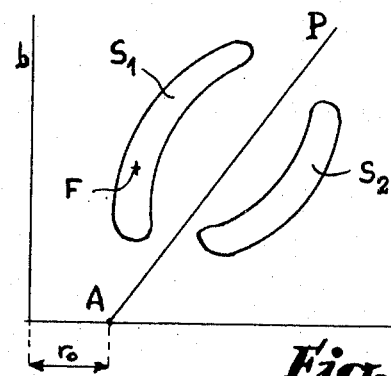
Figure 5:
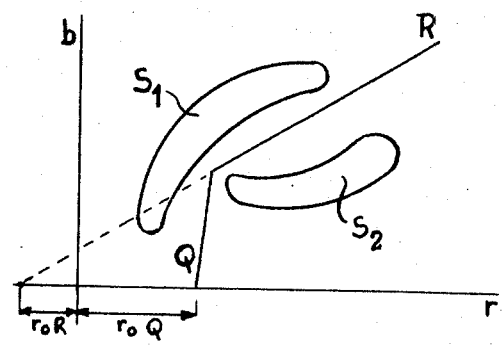

FIGS. 4 and 5 illustrate how the invention permits of differentiating two dyes in the case of two primary colors by means of a two-dimensional system of coordinates.

Figure 6:
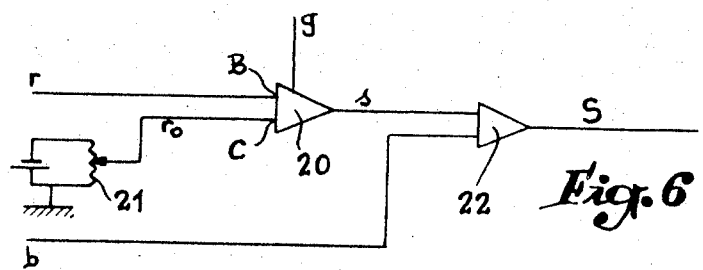
Figure 7:
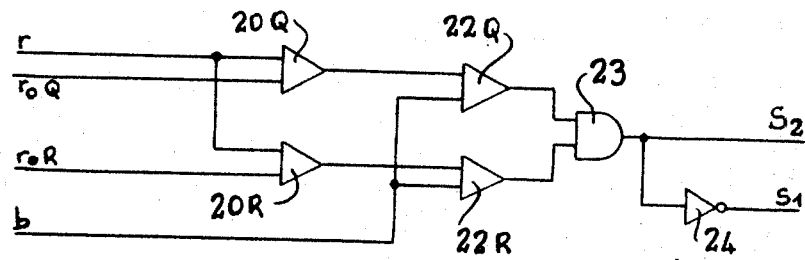

FIGS. 6 and 7 illustrate in block form the electronic circuits adapted to effect the automatic differentiation between the two dyes in the case respectively of FIG. 4 and of FIG. 5.

Figure 8:
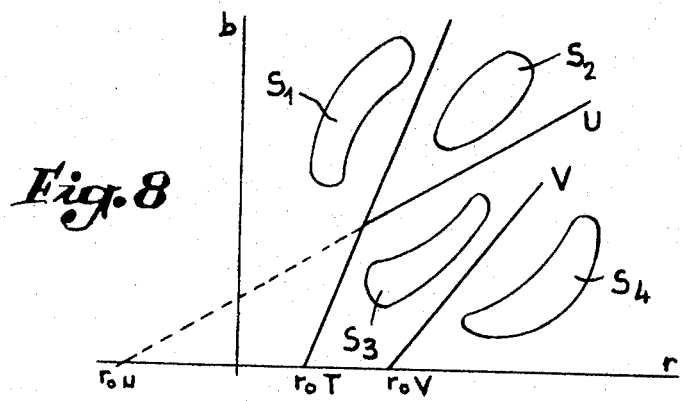

FIG. 8 is a two-dimensional representation similar to that of FIGS. 4 and 5, but corresponding to the case of four dyes.

Figure 9:
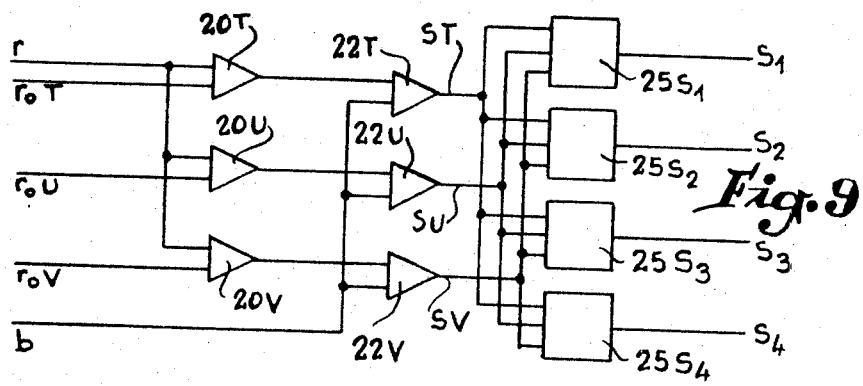

FIG. 9 shows in block form an electric circuit for the differentiation of the four dyes of FIG. 8.

Figure 10:
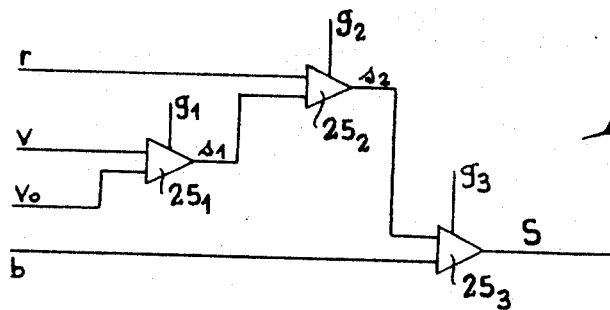

FIG. 10 shows a circuit adapted to the case of three primary colors, i.e., wherein the representative point of a dye is situated in a three-dimensional system of coordinates.

Figure 11:
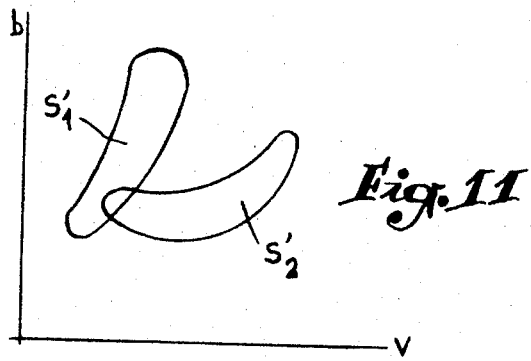
Figure 12:
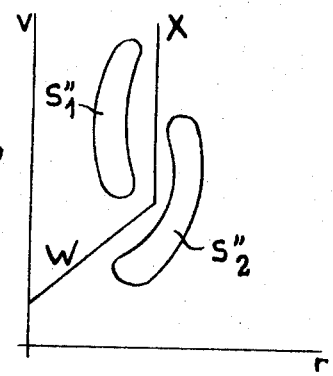
Figure 13:
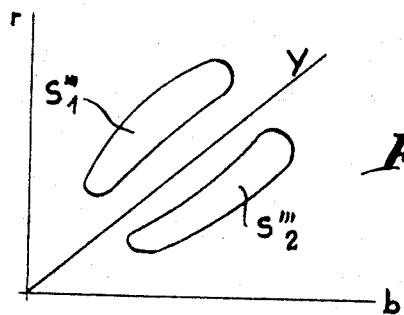

FIGS. 11, 12 and 13 illustrate how the dyes may be represented in three two-dimensional systems of coordinates in the case of three primary colors.

Figure 1:
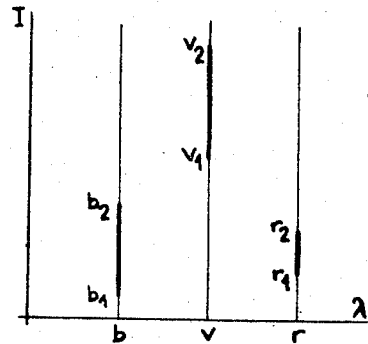
FIG. 1 shows in a diagrammatic manner how it has been proposed to individualize a dye in a three-color system according to the prior art.

In the diagram of FIG. 1 the abscissae correspond to the wave lengths and the ordinates to the light intensities. It has been assumed that the light reflected from the drawing or other sample was analyzed in three primary colors, namely blue ($b$), green ($v$) and red ($r$). In other words the sample (point of a drawing, for instance) receives a light flux of known characteristics and the intensity of the light reflected from this sample is measured in the three primary colors. If the coloring dye C of the sample were of perfectly uniform characteristics and if it were applied on the drawing with a quite uniform density, the intensities or responses thus measured would always be constant for each primary color, whatever could be the sample bearing dye C. But in actual practice such is not the case and on each ordinate $b$, $v$ and $r$ the points corresponding to the intensities vary respectively from $b1$ to $b2$, from $v1$ to $v2$ and from $r1$ to $r2$. Thus it may be said that the three segments $b1-b2$, $v1-v2$ and $r1-r2$ are representative of the dye C.

Figure 2:
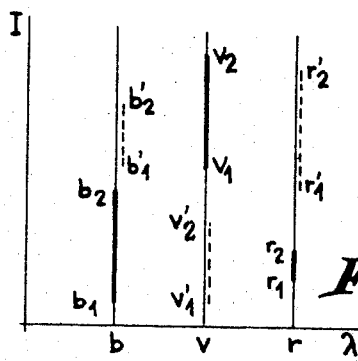
FIG. 2 shows how such a representation does permit of differentiating two dyes when no overlapping occurs.

If now another coloring dye C' is submitted to the same operation, it will be found that it may be represented by another set of three segments $b'1-b'2$, $v'1-v'2$ and $r'1-r'2$ (see FIG. 2). If these three segments do not overlap each other, the diagram of FIG. 2 permits the differentiation of dyes C and C'. It may even be remarked that this differentiation is still possible if there is an overlapping in two of the three primary colors. But if the segments overlap each other in the three colors, as shown in FIG. 3, any automatic differentiation becomes impossible when the responses from the photo-electric elements are situated in the overlapping zone.

Considering the problem from another point of view, the intensities or responses measured in the three primary colors may be plotted in a three-coordinate system $b$, $v$, $r$, in which case segments $b1-b2$, $v1-v2$, $r1-r2$ and $b'1-b'2$, $v'1-v'2$, $r'1-r'2$ respectively define two parallelipipeds. If the segments do not overlap each other in one at least of the three primary colors, this means that the parallelipipeds are separate from each other and that therefore their differentiation is always possible. On the contrary if the segments overlap each other in the three primary colors, the parallelipipeds intersect each other and any automatic differentiation is impossible for any point situated in their common zone.

This inconvenience has hitherto limited automatic color differentiation in the prior art.

The present invention is based on the remark that when a sample bearing dye C gives the response $b1$ in the primary color $b$, it will not at the same time give response $v2$ in color $v$, but a response corresponding to a point situated near $v1$. In other words the responses of a large number of successive samples of the same dye in the three primary colors vary more or less in the same direction, though they are by no way proportional. It results therefrom that in a three-coordinate system, $b$, $v$, $r$ the representative points of a dye do not define a parallelipiped, but a much smaller volume situated within the parallelipiped.

For the sake of simplicity it is possible to consider first the case of a two-color system $b$, $r$ (FIG. 4). In such a system points $b1$, $b2$ and $r1$, $r2$ of FIG. 1 define a rectangle. But in fact when a large number of different samples of the same dye C1 are tested, it is found that the representative points are situated in a much smaller surface S1 delimited by a closed curve which is tangent to the sides of the rectangle. This surface may be considered as the locus of the representative points of the dye C1. For another dye C2 there will be found another small surface S2. These surfaces S1 and S2 are of elongated shape, as shown, and owing to their relatively reduced area they are far less liable to intersect each other than the rectangles which would be defined by points $b1$, $b2$ and $r1$, $r2$, respectively $b'1$, $b'2$ and $r'1$, $r'2$ of FIG. 2. The invention thus corresponds to an important improvement over the prior art.

Automatic differentiation between surfaces S1 and S2 may be realized by means of a line passing between them and which may be physically materialized by electronic means. Such a line may be a straight line such as P (FIG. 4), or a succession of portions of straight lines such as Q and R (FIG. 5). The difference between S1 and S2 is then that the former is above line P (or QR), and the second one below same.

It may be remarked that a straight line such as P is represented by the equation:

$$y = a(x - x')$$

in which $x'$ is the abscissa of the point where the line intersects the $x$-axis, namely point A in FIG. 4.

There exists in the art adjustable gain amplifiers, or operational amplifiers, which generate an outlet proportional to the difference between two voltages applied to their inlets. If a fixed voltage representing the abscissa of point A is applied to the first inlet while the other inlet receives a variable voltage, and if the gain of the amplifier is adjusted to a value representing the slope $a$ in the equation, the outlet voltage of the amplifier will always represent the ordinate of the point of line P which corresponds to the abscissa represented by the variable voltage applied to the second inlet. If now this variable voltage is made equal to the response $r$ of a sample of an unknown dye which may be either C1 or C2, the outlet voltage of the amplifier may be compared with the response $b$ of the unknown dye and it may thus be ascertained whether the representative point $b$, $r$ of the dye is above or below line P, or in other words if the said point corresponds to C1 or to C2.

FIG. 6 illustrates a circuit which may effect automatically the above differentiation. An operational amplifier receives on its first inlet B a voltage $r$ which represents the response of the sample in the red, while a voltage $r0$ representing the abscissa of point A is applied to its second inlet C by means of a potentiometer 21. The gain of the amplifier is set at $a$ by an auxiliary inlet $g$. Its outlet $s$ thus represents the product $a(r - r0)$, i.e., the equation of line P. This outlet is applied to the first inlet of a comparator 22 (which may be formed of another operational amplifier), the other inlet of which receives a signal $b$ representing the repsonse of the sample in the blue. If the representative point of the sample, as determined by its responses $b$ and $r$ in the primary colors blue and red, were situated on line P, the outlet S of comparator 22 would be zero. In fact this outlet will be positive or negative thus indicating that the representative point is below or above line P (assuming that amplifier 20 and comparator 22 generate a positive outlet when their first inlet is at a higher level than their second one). Since the unknown dye is either C1 or C2, the circuit of FIG. 6 will thus realize the differentiation ; if the outlet of 22 is negative, the unknown dye corresponds to surface S1 and is therefore C1, while if the outlet of 22 is positive, this dye will be C2.

When surfaces S1 and S2 are separated from each other by a succession of portions of straight lines, as for instance in FIG. 5, each line may be considered as a condition which may be represented by the outlet of a circuit such as that of FIG. 6. In the case illustrated in FIG. 7 each elementary circuit comprises an operational amplifier, respectively 20Q and 20R which receives signals $r$ and $r0$, and a comparator 22Q, respectively 22R receiving the outlet of the amplifier and signal $b$. The outlets of these comparators are applied to an appropriate gate 23 the outlet of which individualizes dyes C1 and C2 (i.e., surfaces S1 and S2). In the case illustrated in FIG. 5 surface S2 is below both lines Q and R and therefore for any point of this surface the outlets of 22Q and 22R should both be positive. If gate 23 is of the AND type, it will therefore emit a positive outlet whenever the unknown sample is of type C2. The outlet of 23 may further be applied to the inlet of an inverter 24 if it is desired to also obtain a positive signal to identify surface S1 (i.e., dye C1).

The above explanations also apply to the case of more than two types of dye, provided their representative surfaces or loci do not intersect each other. FIG. 8 illustrates for instance the case of four dyes C1, C2, C3, C4, i.e., of four surfaces S1, S2, S3, S4 separated by three lines T, U, V. Considering the representative point of an unknown dye and assuming that the outlet ST, SU, SV (FIG. 9) of each circuit corresponding to a given line is negative when the representative point of the unknown dye is above the said line, the differentiating conditions will be as follows:

for dye C1 (surface S1) : outlets ST, SU and SV negative (or more simply ST negative).

for dye C2 (surface S2) : outlet ST positive, outlets SU and SV negative (or more simply ST positive and SU negative).

for dye C3 (surface S3) : outlets ST, SU positive, outlet SV negative (or more simply SU positive and SV negative).

for dye C4 (surface S4) : outlets ST, SU and SV positive (or more simply SV positive).

FIG. 9 shows how these conditions may be ascertained electronically by means of four gates 25S1, 25S2, 25S3 and 25S4 to which outlets ST, SU and SV are applied. Gate 25S1 may be of the NAND type so as to only generate a positive outlet signal when all its inlets are positive. As to gates 25S2 and 25S3, they may be of either type provided an inverter is inserted on one or two of their three inlets. For instance 25S2 may be of the NAND type if an inverter is inserted between its first inlet and comparator 22T. It will also be apparent that gate 25S1 may be replaced by a mere inverter receiving outlet ST, that the third inlet of 25S2 may be omitted, etc... In any case the individual outlets of gates 25S1, 25S2, 25S3 and 25S4 fully identify the four dyes.

It has been hitherto assumed that only two primary colors (blue and red) were used to identify the dyes. In the case of three primary colors or wave lengths, the locus of the representative points of each dye is no more a surface, but a volume. But here again these volumes generally do not intersect each other and therefore it is possible to separate them by intermediate surfaces, practically speaking by planes or portions of planes. Each plane may be represented by an equation which may be in turn analogically represented by electric circuits of the type described with reference to FIG. 6.

FIG. 10 illustrates a circuit corresponding to three primary colors, namely blue $b$, green $v$ and red $r$. A first operational amplifier 251 receives signal or response $v$ and an adjustable signal $v0$. Its gain is $g1$. Its outlet $s1$ is applied to the second inlet of another operational amplifier 252 the first inlet of which receives signal $r$. The gain of this amplifier is $g2$. The outlet $s2$ of 252 is applied to the first inlet of a third operational amplifier 253 having a gain $g3$ and which receives on its second outlet the signal $b$. The outlet S of 253 is the general outlet of the circuit. It is obvious that:

$$s1 = g1 (v - v0)$$
$$s2 = g2 (r - s1)$$
$$S = g3 (s2 - b)$$

and therefore:

$$S = g3 (rg2 - vg1g2 + v0g1g2 - b).$$

The general outlet voltage S thus becomes zero for any point the coordinates $b, v, r$ of which are such that:

$$b = rg2 - vg1g2 + v0g1g2.$$

This equation corresponds to a plane in a three-coordinate system. It results therefrom that when the responses $b, v, r$ corresponding to an unknown dye are applied to the circuit of FIG. 10, the sign of the outlet S will indicate on which side of this plane the representative point of the said dye is situated in the three-coordinate system $b, v, r$.

The above explanations may be extended to the case of any number of primary dyes. For instance with four dyes it is possible to imagine a four-dimensional space and therefore a four-coordinate system in which the locus of each dye is a four-dimensional volume, these volumes being separated from each other by three-dimensional surfaces.

But it is generally possible to avoid the intricate representation of volumes, and more particularly of volumes having more than three dimensions, by considering the primary colors in successive pairs. For instance in the case of three primary colors these pairs will be $bv$, $vr$ and $rb$. Each pair may be represented in a two-coordinate system which may be considered as the projection of the three-coordinate system $b, v, r$ on one of the three planes defined by the three coordinate axes. The differentiation thus obtained is less perfect since it may occur that two volumes which do not intersect each other in the three-dimensional space, have their projections intersecting each other in the said planes. But this is rather unfrequent and on the other hand the electronic equipment required is greatly simplified.

FIGS. 11 to 13 illustrate the case of two dyes with three primary colors $b, v, r$. In the first two-dimensional system $bv$ (FIG. 11) the surfaces or loci S'1 and S'2 intersect each other and therefore do not permit a safe differentiation. In the system $vr$ the corresponding surfaces S''1 and S''2 are admittedly spaced from each other, but they cannot be separated by a single straight line and two lines W and X must be used, which would somewhat complicate the electronic equipment. But in the third system $rb$ the corresponding surfaces S'' 1 and S'' 2 may be separated by a single straight line Y which besides may pass through the intersection of the coordinate axes and therefore be represented by a quite simplified electronic circuit.

It is obvious that the same method may be applied to more than three primary colors or wave lengths, here again provided that if the volumes or loci of the various dyes C1, C2, C3, etc. do not intersect each other, their projections in the planes of the coordinate axes also do not intersect each other in one at least of the said planes.

It should be remarked in this repsect that differentiation is only impossible when the intersection concerns the same dyes in all the planes. In other words with the three primary colors and, say, four dyes C1, C2, C3, C4, differentiation is impossible when for instance the surfaces or loci of C1 and C2 intersect each other in the three planes $b-v$, $v-r$ and $r-b$. But it remains quite possible if for instance the locus of C1 intersects the locus of C2 in planes $b-v$ and $v-r$, but intersects another locus, as for instance that of C3, in plane $r-b$. It is indeed clear that in such a case the representative point of the unknown dye cannot be included in the two same surfaces or loci in the three two-dimensional systems.

I claim:

1. In a method for the automatic recognition of the coloring dyes used in a sample such as a drawing for the preparation of the perforated cards or bands for loom Jacquards, by means of photo-sensitive means which analyze in a number of primary colors or wave lengths the light reflected by each of the dyes to be recognized when the corresponding portion of the sample is illuminated by a light beam of predetermined characteristics, recognition of each dye from which the light is reflected being based on the position of the point which represents the responses of the photo-sensitive means corresponding to each of said primary colors in a system of coordinates in which each axis corresponds to one of said primary colors, the response of each of said photo-sensitive means being plotted along the one of said axes which corresponds to the same primary color, the improvement which consists in determining for each of said dyes to be recognized the permissible variations in its color attribrites and in its density on the sample in said coordinate system;

in determining in said system of coordinates the locus of all the possible points representative of the color attribrites and density of each of said dyes to be recognized, taking into account said permissible variations, to thus obtain a number of loci equal to the number of said dyes;

in drawing in said system of coordinates at least one geometrical figure which separates from each other the loci of the dyes to be recognized, said figures having a dimension less than said loci;

in analogically representing each of said figures by an electronic circuit so as to obtain a number of circuits equal to the number of said separating figures, each of said circuits, when receiving inlet signals corresponding to the color of a dye expressed by the coordinates of a point in said system, emitting an outlet signal at a predetermined level when said last-named point is part of the separating figure represented by said last-named circuit, at a level above said predetermined level when said last-named point is situated on one side of said last-named figure, and at a level below said predetermined level when said last-named point is on the other side of said last-named separating Figure;

in applying as inlet signals to each of said circuits the responses of said photo-sensitive means;

and in determining from the levels of the outlet signals of said electronic circuits the location of the representative point of the dye to be recognized with respect to the location of said figures.

2. In a method as claimed in claim 1:
said primary colors being two in number;
said system of coordinates being two-dimensional;
each of said loci being a surface delimited by a closed curve;
and some at least of said separating figures being formed of a straight line.

3. In a method as claimed in claim 1:
said primary colors being two in number;
said system of coordinates being two-dimensional;
each of said loci being a surface delimited by a closed curve;
and some at least of said separating figures being formed of a succession of segments of different straight lines.

4. In a method as claimed in claim 1:
said primary colors being three in number;
said system of coordinates being three-dimensional;
each of said loci being a volume delimited by a surface closed on itself;
and some at least of said separating figures being formed of a plane.

5. In a method as claimed in claim 1:
said primary colors being three in number;
said system of coordinates being three-dimensional;
each of said loci being a volume delimited by a surface closed on itself;
and some at least of said separating figures being formed of a succession of portions of different planes.

6. In a method for the automatic recognition of the coloring dyes used in a sample such as a drawing for the preparation of the perforated cards or bands for loom Jacquards, by means of photo-sensitive means which analyze in more than two primary colors or wave lengths the light reflected by each of the dyes to be recognized when the corresponding portion of the sample is illuminated by a light beam of predetermined characteristics, recognition of each dye from which the light if reflected being based on the responses of the photo-sensitive means corresponding to each of said primary colors, the improvement which consists:

in determining the representative point which corresponds to the responses of said photo-sensitive means for each pair of said primary colors in a two-dimensional system of coordinates in which each axis corresponds to one of the primary colors of said each pair, by plotting the response of each of said last-named photo-sensitive means along the one of said axes which corresponds to the same primary color for each dye, so as to obtain a number of two dimensional systems equal to the possible number of pairs of said primary colors with each of said dyes to be recognized being represented in each of said systems;

in determining for each of said dyes to be recognized the permissible variations in its color attribrites and in its density on the sample;

in determining in each of said two-dimensional systems of coordinates the curve which delimits the locus of all the possible representative points of each of said dyes to be recognized, taking into account the permissible variations of same;

in drawing in each of said two-dimensional systems of coordinates lines which separate from each other the loci of said dyes to be recognized;

in analogically representing each of said lines by an electronic circuit means for obtaining in each of said two-dimensional systems a number of circuits equal to the number of separating lines, each of said circuits, when receiving inlet signals corresponding to the coordinates of a point in said last-named system, emitting an outlet signal at a predetermined level when said last-named point is part of the separating line represented by said last-named circuit, at a level above said predetermined level when said last-named point is situated on one side of said last-named line, and at a level below said predetermined level when said last-named point is on the other side of said last-named separating line;

in applying as inlet signals to each of said circuits the responses of said photo-sensitive means in the two primary colors corresponding to the one of said two-dimensional systems which includes the one of said separating lines to which said last-named circuit corresponds;

and in determining from the level of the outlet signals of said electronic circuits between each of said separating lines the representative point of each dye to be recognized is situated in some at least of said two-dimensional systems of coordinates.

7. In a method as claimed in claim 6, some at least of said separating lines being straight lines.

8. In a method as claimed in claim 6, some at least of said lines being formed of a succession of segments of different straight lines.

* * * * *